United States Patent
Kang et al.

(10) Patent No.: US 11,200,389 B2
(45) Date of Patent: Dec. 14, 2021

(54) TAG SELECTION TYPE OPTICAL RFID TAG DEPENDING ON PRESENCE OR NOT OF VISIBLE LIGHT

(71) Applicant: IDRO CO., LTD, Suwon-si (KR)

(72) Inventors: Yanggi Kang, Yongin-si (KR); Sangmok Lee, Daejeon (KR)

(73) Assignee: IDRO CO., LTD, Suwon-si (KR)

(*) Notice: Subject to any disclaimer, the term of this patent is extended or adjusted under 35 U.S.C. 154(b) by 0 days.

(21) Appl. No.: 16/721,933

(22) Filed: Dec. 20, 2019

(65) Prior Publication Data
US 2020/0210657 A1    Jul. 2, 2020

(30) Foreign Application Priority Data
Dec. 28, 2018 (KR) .................... 10-2018-0171903

(51) Int. Cl.
*G06K 7/10* (2006.01)
*G06K 19/077* (2006.01)

(52) U.S. Cl.
CPC ... *G06K 7/10366* (2013.01); *G06K 19/07773* (2013.01)

(58) Field of Classification Search
CPC .................................................. G06K 7/10366
USPC ....................................................... 235/451
See application file for complete search history.

(56) References Cited

U.S. PATENT DOCUMENTS

2014/0086586 A1* 3/2014 Voutilainen .......... H04B 10/801
                                                                398/115

FOREIGN PATENT DOCUMENTS

KR    10-1870838 B1    6/2018

* cited by examiner

*Primary Examiner* — Rafferty D Kelly
(74) *Attorney, Agent, or Firm* — Park, Kim & Suh, LLC

(57) ABSTRACT

A tag selection type optical radio frequency identification (RFID) tag depending on presence or not of visible light includes a photodiode configured to convert a visible light-type signal transmitted from a reader into an electrical signal, a tag integrated circuit (IC) configured to read information on the visible-light type signal using an analog digital converter (ADC) or comparator connected to the photodiode to receive the electrical signal therefrom, configured to be operated using energy obtained by converting a radio frequency (RF) signal received from the reader, to return a value determined to correspond to information to the reader, and configured to transmit stored data according to a command obtained by demodulating the electrical signal of the photodiode to the reader, and an antenna configured to facilitate reception of the RF signal by the tag IC or to facilitate transmission of the value and the data from the tag IC.

16 Claims, 5 Drawing Sheets

TAG SELECTION TYPE OPTICAL RFID TAG DEPENDING ON PRESENCE OR NOT OF VISIBLE LIGHT

CROSS-REFERENCE TO RELATED APPLICATION

This application claims the benefit of Korean Patent Application No. 10-2018-0171903, filed on Dec. 28, 2018, which is hereby incorporated by reference as if fully set forth herein.

BACKGROUND

1. Technical Field

The present disclosure relates to a tag selection type optical radio frequency identification (RFID) tag depending on presence or not of visible light, and more particularly, to a tag selection type optical RFID tag depending on presence or not of visible light that has a simplified tag structure while avoiding interference between tags, checks information of visible light transmitted from a reader using an analog digital converter (ADC) or a comparator, and returns a value corresponding to the information to the reader, thereby enhancing the accuracy of tag selection.

2. Description of Related Art

In general, an optical radio frequency identification (RFID) tag receives an optical command from a reader and backscatters the optical command to a reader using an RF method. Thus, the optical RFID tag needs to include a photodiode (PD) for receiving the optical command or an optical reception device for performing a similar function thereto.

According to the optical RFID tag technology, in order to selectively read only a wanted tag, a reader transmits a command to a tag using a visible light signal, and simultaneously, in order to supply energy to the tag, a pure carrier wave (CW) is transmitted to the tag. In this method, the tag receives the visible light signal from the reader and backscatters information using an RF method according to a command of the visible light signal.

As technologies related to a conventional optical RFID tag, Korean Patent No. 10-1870838 discloses "Optical RFID System using Light Receiving Sensor of Mobile device", which includes: a carrier reception module configured to transmit an RF type carrier wave of a predetermined frequency; a mobile device module including a substrate for a mobile device, a visible light receiver installed on the substrate and configured to receive a query signal in the form of visible light and to convert the query signal into an electrical signal, a tag controller installed on the substrate and configured to process a command of the query signal received from the visible light receiver and to generate a response signal with respect to the query signal, a carrier receiver installed on the substrate and configured to receive the carrier wave, and a high frequency transmitter installed on the substrate and configured to transmit the response signal in the form of an RF carrier signal with respect to a carrier wave received from the carrier receiver using energy of the carrier wave, and a reader module including a reader controller configured to generate the query signal, a visible light transmitter configured to transmit the query signal received from the reader controller in the form of visible light, a high frequency receiver configured to receive the response signal in the form of RF, and a reader decoder configured to decode the response signal received from the high frequency receiver, wherein the reader module further includes an RF transmitter configured to transmit the query signal generated by the reader controller of the reader module in the form of RF, the mobile device module further includes an RF receiver configured to receive the query signal in the form of RF and to convert the query signal into an electrical signal, the visible light receiver of the mobile device module is an illuminance sensor of the mobile device, installed on the substrate for the mobile device, the reader module is a card terminal for fee settlement, the query signal transmitted from the reader module is settlement request information, and the response signal returned from the mobile device module uses a light receiving sensor of a mobile device corresponding to a pre-stored settlement approval number.

Because a conventional RFID system uses only wireless transmission and reception, the system has difficulty in identifying a target tag of the system while being managed in an environment in which a plurality of readers are operated or an environment adjacent to the tag. In contrast, in order to overcome this problem, the optical RFID tag technology stated in the conventional art uses combination of RFID communication technology and optical RFID technology in order to read only a wanted tag, and in this regard, the conventional optical RFID tag is configured in such a way that a demodulator of a light receiver is disposed in an SoC chip. Accordingly, there is a problem in that the configuration of the SoC chip complicates the structure, and there is a need for a method of simplifying the complicated structure.

SUMMARY OF THE INVENTION

An aspect of the present disclosure is to have a simplified tag structure while avoiding interference between tags, to be easily manufactured, to be simultaneously have enhanced reliability of an operation, to return a value corresponding to information, which is acquired using an analog digital converter (ADC) or a comparator from visible light transmitted from a reader, to the reader, and to accurately receive data of a tag that has been selected by the reader.

Other objectives of the present disclosure may be easily understood through the following description of embodiments.

To achieve the above objectives, according to an aspect of the present disclosure, a tag selection type optical radio frequency identification (RFID) tag depending on presence or not of visible light includes a photodiode configured to convert a visible light-type signal transmitted from a reader into an electrical signal, a tag integrated circuit (IC) configured to read information on the visible-light type signal using an analog digital converter (ADC) or comparator connected to the photodiode to receive the electrical signal therefrom, configured to be operated using energy obtained by converting a radio frequency (RF) signal received from the reader, to return a value determined to correspond to information to the reader, and configured to transmit stored data according to a command obtained by demodulating the electrical signal of the photodiode to the reader, and an antenna configured to facilitate reception of the RF signal by the tag IC or to facilitate transmission of the value and the data from the tag IC.

The tag IC may read on/off information on the visible-light type signal and may transmit a value of on/off to the reader using the ADC or the comparator, and may return the values, which includes a converted value when the ADC is used or includes level high information when the comparator is used, to the reader through the antenna.

When the ADC is used, the tag IC may configure a code value transmitted from the reader with a value between 2 bits and n bits to use ($2^n-2$) bit patterns, may return the code value corresponding to the bit pattern to the reader through the antenna, and may check whether a tag has been selected by the reader.

The tag IC may use a light pattern obtained by changing brightness of visible-light type signal transmitted from the reader for each time slot, may return a transmission pattern corresponding to the light pattern to the reader through the antenna, and may check whether a tag has been selected by the reader.

The tag IC may include a signal processor including an analog digital converter (ADC) or comparator connected to the photodiode to receive an electrical signal therefrom, and configured to receive the visible-light type signal and to process the visible-light type signal to acquire information, a digital part configured to receive the information on the visible-light type signal from the signal processor, to perform control to return a value determined to correspond to the information to the reader, and to transmit data stored in a memory to the reader according to a command obtained by demodulating the electrical signal of the photodiode, a voltage multiplier configured to receive an RF signal from the antenna and to convert and amplify the RF signal to DC power required for an operation, an analog part configured to transmit data, to be transmitted to the digital part, to the reader via a backscattering process, a modulator configured to modulate the signal transmitted through the antenna, and a demodulator configured to demodulate the signal received through the antenna.

The tag IC may include a SoC chip separated from the photodiode.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
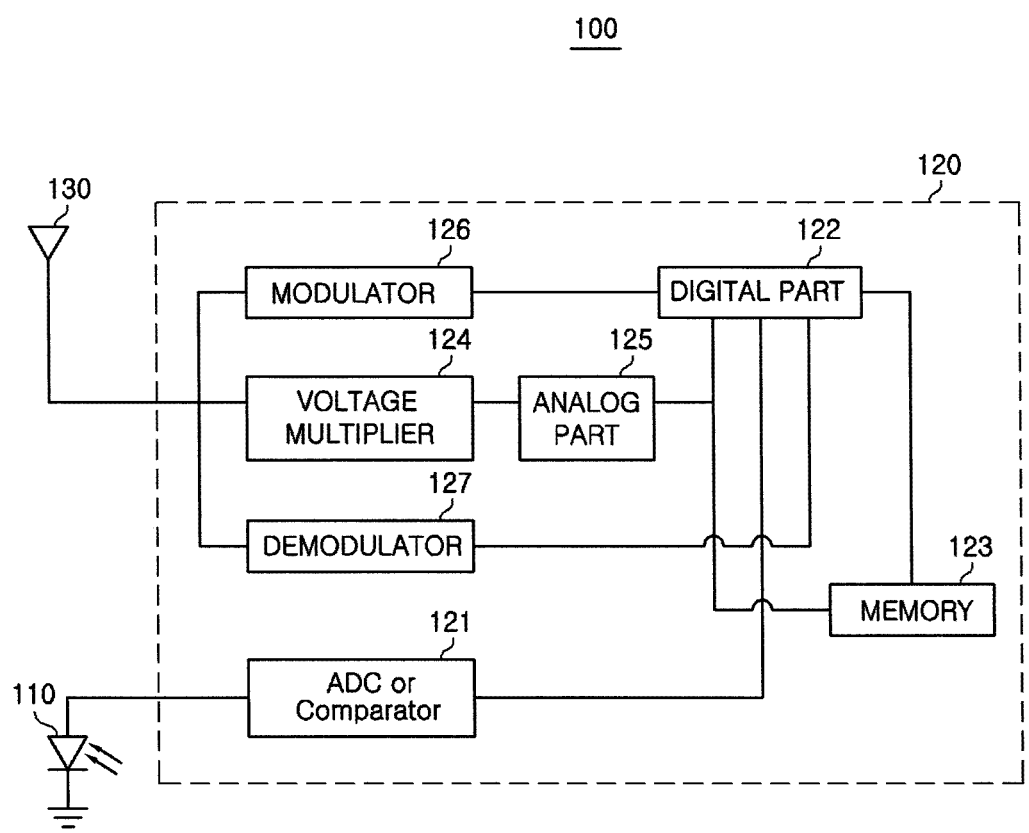
FIG. 1 is a diagram showing the configuration of a tag selection type optical radio frequency identification (RFID) tag depending on presence or not of visible light according to an embodiment of the present disclosure.

Exemplary embodiments of the present disclosure can be variously changed and embodied in various forms, in which illustrative embodiments are shown. However, exemplary embodiments of the present disclosure should not be construed as being limited to the embodiments set forth herein and any changes, equivalents or alternatives which are within the spirit and scope of the present disclosure should be understood as falling within the scope of the present disclosure and may be changed in various forms, and the scope of the present disclosure should not be limited to the following embodiments.

The present disclosure will now be described more fully with reference to the accompanying drawings, in which exemplary embodiments are shown. In the drawings, the same elements are denoted by the same reference numerals, and a repeated explanation thereof will not be given.

FIG. 1 is a diagram showing the configuration of a tag selection type optical RFID tag depending on presence or not of visible light according to an embodiment of the present disclosure.

Referring to FIG. 1, a tag selection type optical RFID tag 100 depending on presence or not of visible light according to an embodiment of the present disclosure may include a photodiode 110, a tag integrated circuit (IC) 120, and an antenna 130.

The photodiode 110 may convert a visible-light type signal transmitted from a reader into an electrical signal.

The tag IC 120 may read information on the visible-light type signal using an analog digital converter (ADC) or comparator connected to the photodiode 110 to receive the electrical signal therefrom, may be operated using energy obtained by converting the RF signal received from the reader, may return a value determined to correspond to information to the reader, and may transmit stored data according to a command obtained by demodulating the electrical signal of the photodiode 110 to the reader.

The tag IC 120 may include a signal processor 121 connected to the photodiode 110 to receive the electrical signal therefrom and including an analog digital converter (ADC) or comparator configured to receive the visible-light type signal and to process the signal for acquiring information, a digital part 122 configured to receive information on the visible-light type signal from the signal processor 121, to perform control to return a value determined to correspond to information to the reader, and to transmit data stored in a memory 123 to the reader according to the command obtained by demodulating the electrical signal of the photodiode 110, a voltage multiplier 124 configured to receive an RF signal from the antenna 130 and to convert and amplify the RF signal to DC power required for an operation, an analog part 125 configured to transmit the data, to be transmitted to the digital part 122, to the reader via a backscattering process, a modulator 126 configured to modulate the signal transmitted through the antenna 130, and a demodulator 127 configured to demodulate the signal received through the antenna 130.

The voltage multiplier 124 may generate a signal or CW received from the antenna 130 directly or using a separate DC converter and may provide energy required for an operation of the tag. The command of the reader may be obtained by demodulating an analog signal such as Inventory, Read, or Write of the reader by the demodulator 127 and may be transmitted to the digital part 122. The digital part 122 may transmit a value stored in the memory 123 to the reader through the analog part 125 according to the demodulated command such as Inventory or Read. The analog part 125 may perform a backscattering process on the reader from the tag 100. The tag IC 120 may include a SoC chip separated from the photodiode 110.

The antenna 130 may facilitate reception of the RF signal by the tag IC 120 or may facilitate transmission of a value or data from the tag IC 120.

Figure 2:
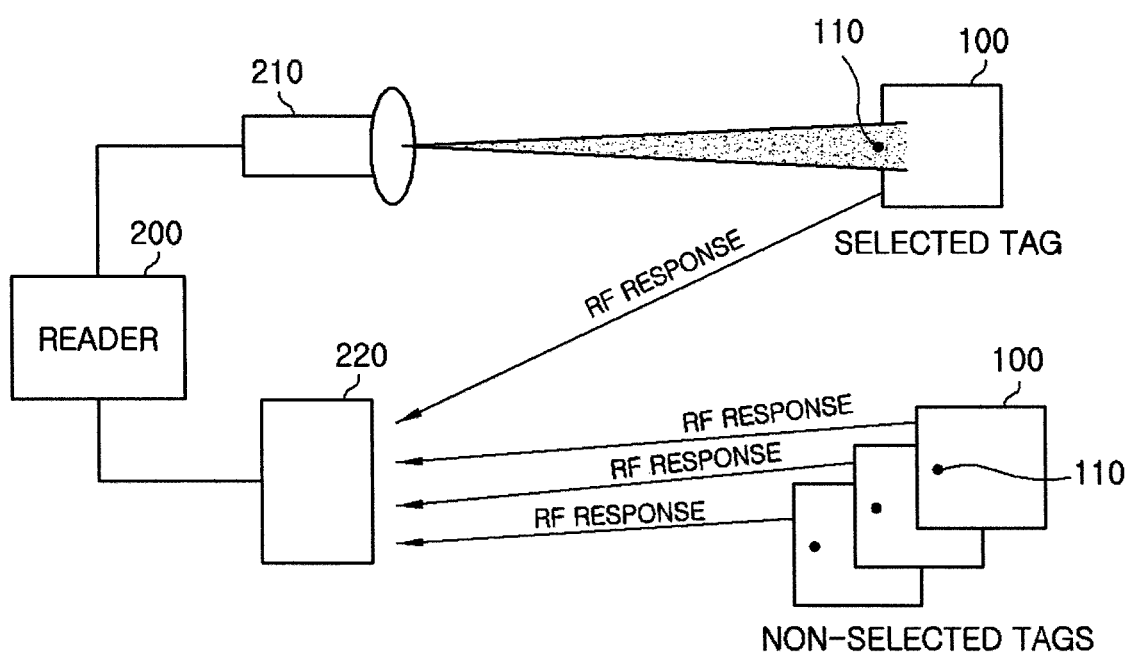
FIG. 2 is a diagram showing a configuration of a case in which only light-on of visible light is used without a transmission pattern with respect to a visible light tag selection type optical RFID tag depending on presence or not according to an embodiment of the present disclosure.

Referring to FIGS. 1 and 2, for example, the tag IC 120 may read on/off information on a visible-light type signal emitted from a visible light transmitter 210 of a reader 200 and may transmit a value of on/off to an antenna 220 of the reader 200 using an ADC or a comparator, that is, the signal processor 121, and may return the value, which includes a converted value when the ADC is used or includes level high information when the comparator is used, to the reader 200 through the antenna 130. For example, the tag IC 120 including a SoC chip may have an ADC or a comparator disposed therein and may be connected to an ADC or a comparator of the photodiode 110, and thus whether an optical signal from the reader 200 is present may be identified by the ADC or the comparator. In order to a wanted tag 100 from the reader 200 that is a transmitter, the reader 200 may transmit an optical signal using the visible light transmitter 210, and the tag 100 that is a receiver may read the on/off information according to the optical signal transmitted from the reader 200. In this case, the reader 200 may transmit a predetermined pattern-type optical signal or a simple light-on signal. In order to receive echo of the simple light-on information or pattern information transmitted from the reader 200, from the tag 100, an Access Read command that is a Gen2 standard protocol may be transmitted, and the tag 100 may return a voltage level value when the optical signal received from the photodiode 110 is processed through an ADC or may return a value of "1" or "0" corresponding to "on" when the optical signal is processed by a comparator, to the reader 200, and thus the reader 200 may identify whether the tag 100 has been selected by the reader 200 itself.

The tag 100 may transmit a voltage input from the photodiode 110 in the form of information to the digital part 122 through an ADC or a comparator.

Figure 3:
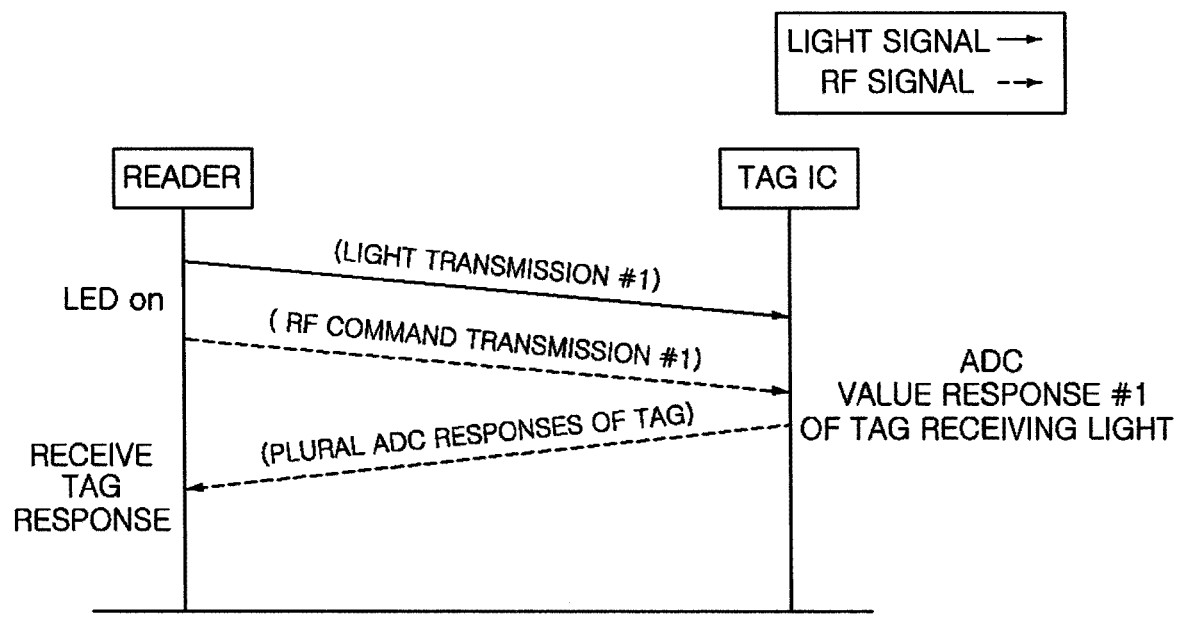
FIG. 3 is a diagram for explanation of an example of a response of a tag with respect to a visible light tag selection type optical RFID tag depending on presence or not according to an embodiment of the present disclosure.

Referring to FIG. 3, the tag 100 that is selected based on light output from the visible light transmitter 210 of the reader 200, for example, a light emitting diode (LED) may return information, which includes an ADC value or includes level high information when a comparator is used, to a reader in response to information of the tag 100.

In another example, when an ADC is used, the tag IC 120 may configure a code value transmitted from the reader 200 a value between 2 bits to n bits to use ($2^n-2$) bit patterns, and thus may return the code value corresponding to the bit pattern to the reader 200 through the antenna 130, thereby identifying whether the tag 100 has been selected by the reader 200 itself.

However, the code value transmitted from the reader 200 may be configured with a minimum of 1 bit to n bits. The ADC may be embodied without being limited by resolution. Light may be basically present in an environment in which the tag 100 corresponding to a receiver is managed. This means that the tag 100 has a random value even if the reader 200 does not transmits light, and the tag 100 may measure a sensing value obtained by adding light transmitted from the reader 200 to the random value. Thus, due to this fact, there is a need for a method of excluding initial surrounding brightness, and in this regard, influence of surrounding brightness may be excluded using the following method.

That is, when a transmission signal is configured using the code value transmitted from the reader 200, the code value may be configured with a minimum of 2 bits to n bits. When 1 bit is used as the code value, two patterns of "1" and "0" may be present, and only the case of "on" may correspond to a valid signal. In contrast, when 2 bits are used as the code value, the reader 200 may crease four patterns as shown in Table 1 below.

TABLE 1

| Code 0 | Code 1 | Code |
|--------|--------|------|
| 0 (Low) | 0 (Low) | 00 |
| 0 (Low) | 1 (High) | 01 |
| 1 (High) | 0 (Low) | 10 |
| 1 (High) | 1 (High) | 11 |

Here, when all transmission signals are off like in the case of code 00 and when all transmission signals are on like in the case of code 11, these code values are not appropriate to be used as a bit pattern, for example, a test pattern, and only ($2^n-2$) code values may be used as a bit pattern in reality. For example, when 3 bits are used as a test pattern, $2^3-2=6$ patterns may be used. Here, n is not particularly limited but may be determined within a range appropriate to rapidly transmit and receive data, for example, 2, 3, 4, 5, or 6.

In another example, the tag IC 120 may use a light pattern obtained by changing brightness of visible-light type signal transmitted from the reader 200 for each time slot, may return a transmission pattern corresponding to the light pattern to the reader 200 through the antenna 130, and thus may check whether a corresponding tag has been selected by the reader 200 itself.

Figure 4:
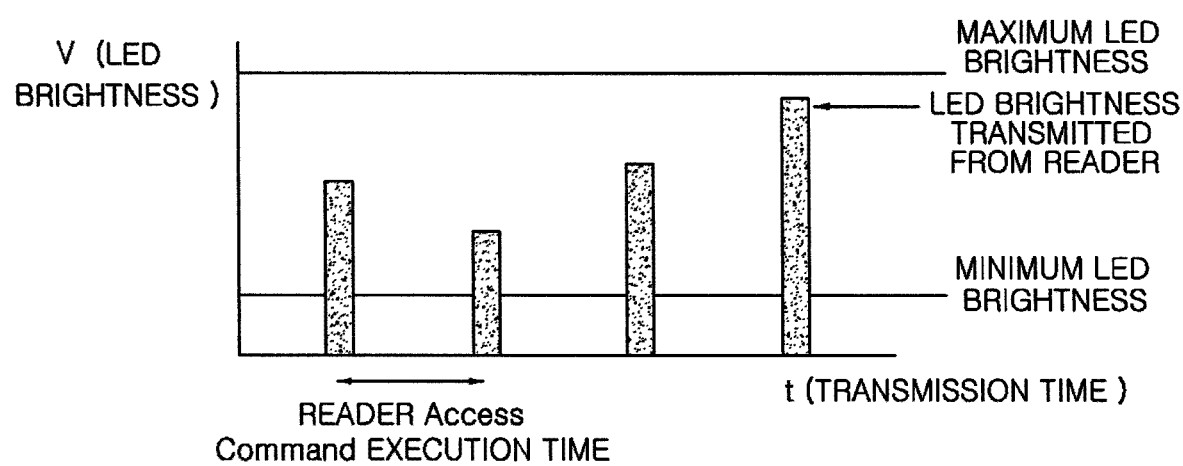
FIG. 4 is a graph for explanation of transmission of a transmission signal using a change of brightness in a visible light tag selection type optical RFID tag depending on presence or not according to an embodiment of the present disclosure.

As shown in FIG. 4, the reader 200 may transmit a visible-light type signal which is emitted from the visible light transmitter 210 and has brightness changed for each time slot, and in this case, the tag 100 may transmit a value of brightness received for each time slot to the reader 200 through an analog digital converter (ADC). The reader 200 may determine a transmission light pattern thereof, may identify a transmission light pattern transmitted as a response from the tag 100, and may check whether the tag 100 has been selected by the reader 200 itself.

Figure 5:
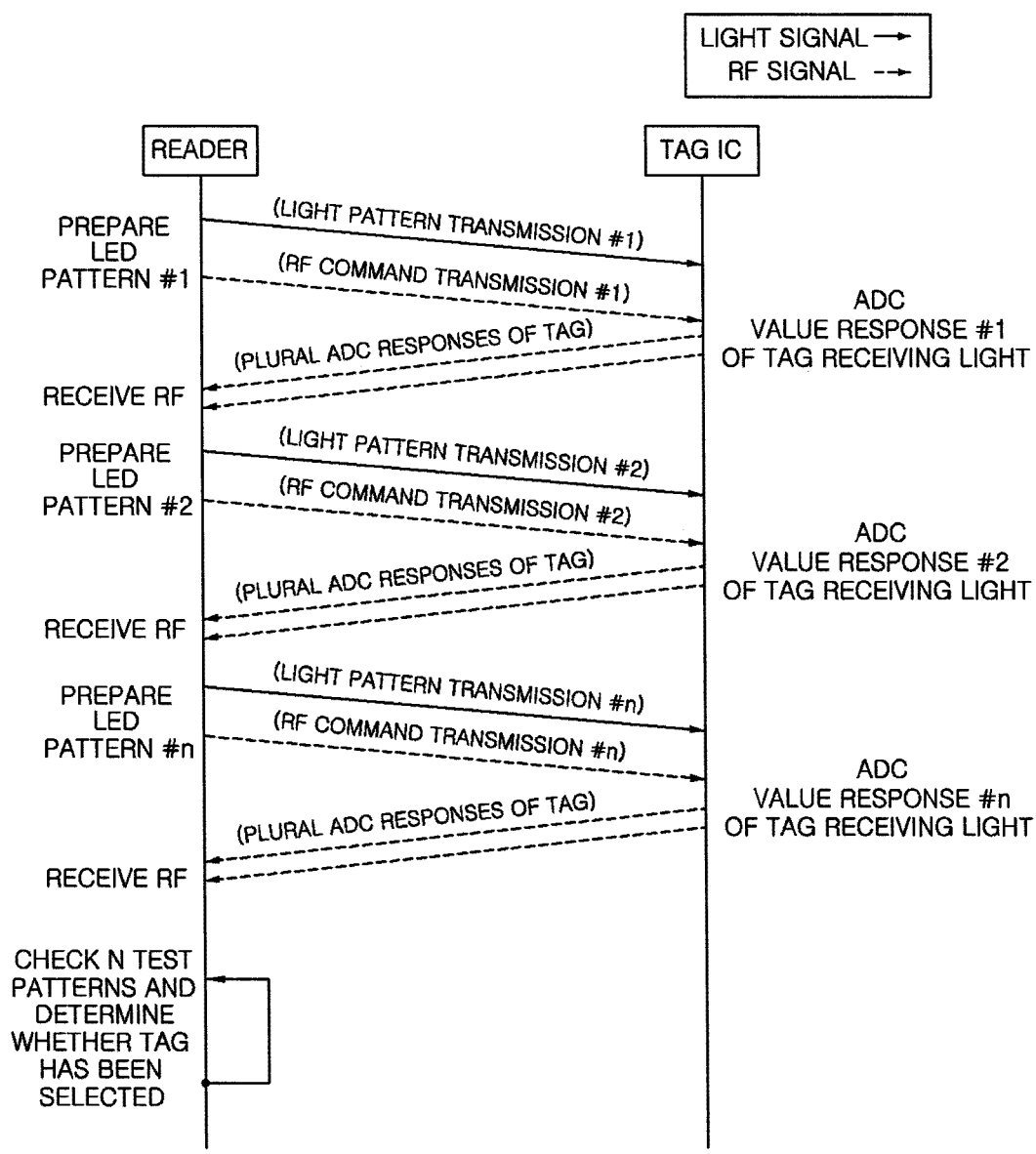
FIG. 5 is a diagram for explanation of a transmission and reception sequence with respect to a light pattern obtained by changing brightness for each slot time in a visible light tag selection type optical RFID tag depending on presence or not according to an embodiment of the present disclosure.

With reference to FIG. 5, a transmission and reception sequence with respect to a light pattern will be described. First, the reader 200 may prepare a pattern of "0" and "1" that is different for each transmission slot time or an optical brightness level of the visible light transmitter 210 and then may preferentially transmit a light pattern to the tag 100. Then, the reader 200 may wirelessly transmit an RFID command for reading an ADC value from the tag 100. Upon receiving the command, the tag 100 may prepare a digital value obtained through an ADC and may transmit a tag ID and an ADC value to the reader 200 in response to the command. Thus, the reader 200 may check whether the ADC value having a plurality of slot times and received as a response from the tag 100 corresponds to a light pattern that has been transmitted from the reader 200 itself, thereby identifying whether the tag 100 has been selected by the reader 200.

As such, the tag selection type optical RFID tag depending on presence or not of visible light according to the present disclosure may have a simplified tag structure while avoiding interference between tags, and thus may be easily manufactured and may simultaneously have enhanced reliability of an operation.

In addition, according to the present disclosure, a value corresponding to information, which is acquired using an analog digital converter (ADC) or a comparator from visible light transmitted from a reader, may be return to the reader, and thus data of a tag that has been selected by the reader may be accurately received.

The tag selection type optical RFID tag depending on presence or not of visible light according to the present disclosure may have a simplified tag structure while avoiding interference between tags, and thus may be easily manufactured and may simultaneously have enhanced reliability of an operation, and in addition, the tag selection type optical RFID tag depending on presence or not of visible light may return a value corresponding to information, which is acquired using an analog digital converter (ADC) or a comparator from visible light transmitted from a reader, to the reader, and thus may accurately receive data of a tag that has been selected by the reader.

While the embodiments have been explained in relation to its embodiments, it is to be understood that various modifications thereof will become apparent to those skilled in the art upon reading the specification. Therefore, it is to be understood that the embodiments disclosed herein is intended to cover such modifications as fall within the scope of the appended claims.

What is claimed is:

1. A tag selection type optical radio frequency identification (RFID) tag depending on presence or not of visible light, comprising:
    a photodiode configured to convert a visible light-type signal transmitted from a reader into an electrical signal;
    a tag integrated circuit (IC) configured to read information on the visible-light type signal using an analog digital converter (ADC) or comparator connected to the photodiode to receive the electrical signal therefrom, configured to be operated using energy obtained by converting a radio frequency (RF) signal received from the reader, to return a value determined to correspond to information to the reader, and configured to transmit stored data according to a command obtained by demodulating the electrical signal of the photodiode to the reader; and
    an antenna configured to facilitate reception of the RF signal by the tag IC or to facilitate transmission of the value and the data from the tag IC,
    wherein, when the ADC is used, the tag IC configures a code value transmitted from the reader with a value between 2 bits and n bits to use ($2^n-2$) bit patterns, returns the code value corresponding to the bit pattern to the reader through the antenna, and checks whether a tag has been selected by the reader.

2. The tag selection type optical RFID tag depending on presence or not of visible light of claim 1, wherein the tag IC reads on/off information on the visible-light type signal and transmits a value of on/off to the reader using the ADC or the comparator, and returns the value of on/off, which includes a converted value when the ADC is used or includes level high information when the comparator is used, to the reader through the antenna.

3. The tag selection type optical RFID tag depending on presence or not of visible light of claim 2, wherein the tag IC includes:
    a signal processor including an analog digital converter (ADC) or comparator connected to the photodiode to receive an electrical signal therefrom, and configured to receive the visible-light type signal and to process the visible-light type signal to acquire information;
    a digital part configured to receive the information on the visible-light type signal from the signal processor, to perform control to return a value determined to correspond to the information to the reader, and to transmit data stored in a memory to the reader according to a command obtained by demodulating the electrical signal of the photodiode;
    a voltage multiplier configured to receive an RF signal from the antenna and to convert and amplify the RF signal to DC power required for an operation;
    an analog part configured to transmit data, to be transmitted to the digital part, to the reader via a backscattering process;
    a modulator configured to modulate the signal transmitted through the antenna; and
    a demodulator configured to demodulate the signal received through the antenna.

4. The tag selection type optical RFID tag depending on presence or not of visible light of claim 3, wherein the tag IC includes a SoC chip separated from the photodiode.

5. The tag selection type optical RFID tag depending on presence or not of visible light of claim 1, wherein the tag IC uses a light pattern obtained by changing brightness of visible-light type signal transmitted from the reader for each time slot, returns a transmission pattern corresponding to the light pattern to the reader through the antenna, and checks whether a tag has been selected by the reader.

6. The tag selection type optical RFID tag depending on presence or not of visible light of claim 5, wherein the tag IC includes:
    a signal processor including an analog digital converter (ADC) or comparator connected to the photodiode to receive an electrical signal therefrom, and configured to receive the visible-light type signal and to process the visible-light type signal to acquire information;
    a digital part configured to receive the information on the visible-light type signal from the signal processor, to perform control to return a value determined to correspond to the information to the reader, and to transmit data stored in a memory to the reader according to a command obtained by demodulating the electrical signal of the photodiode;
    a voltage multiplier configured to receive an RF signal from the antenna and to convert and amplify the RF signal to DC power required for an operation;
    an analog part configured to transmit data, to be transmitted to the digital part, to the reader via a backscattering process;
    a modulator configured to modulate the signal transmitted through the antenna; and
    a demodulator configured to demodulate the signal received through the antenna.

7. The tag selection type optical RFID tag depending on presence or not of visible light of claim 6, wherein the tag IC includes a SoC chip separated from the photodiode.

8. The tag selection type optical RFID tag depending on presence or not of visible light of claim 1, wherein the tag IC includes:
    a signal processor including an analog digital converter (ADC) or comparator connected to the photodiode to receive an electrical signal therefrom, and configured to receive the visible-light type signal and to process the visible-light type signal to acquire information;

a digital part configured to receive the information on the visible-light type signal from the signal processor, to perform control to return a value determined to correspond to the information to the reader, and to transmit data stored in a memory to the reader according to a command obtained by demodulating the electrical signal of the photodiode;

a voltage multiplier configured to receive an RF signal from the antenna and to convert and amplify the RF signal to DC power required for an operation;

an analog part configured to transmit data, to be transmitted to the digital part, to the reader via a backscattering process;

a modulator configured to modulate the signal transmitted through the antenna; and a demodulator configured to demodulate the signal received through the antenna.

9. The tag selection type optical RFID tag depending on presence or not of visible light of claim 8, wherein the tag IC includes a SoC chip separated from the photodiode.

10. A tag selection type optical radio frequency identification (RFID) tag depending on presence or not of visible light, comprising:

a photodiode configured to convert a visible light-type signal transmitted from a reader into an electrical signal;

a tag integrated circuit (IC) configured to read information on the visible-light type signal using an analog digital converter (ADC) or comparator connected to the photodiode to receive the electrical signal therefrom, configured to be operated using energy obtained by converting a radio frequency (RF) signal received from the reader, to return a value determined to correspond to information to the reader, and configured to transmit stored data according to a command obtained by demodulating the electrical signal of the photodiode to the reader; and an antenna configured to facilitate reception of the RF signal by the tag IC or to facilitate transmission of the value and the data from the tag IC, wherein the tag IC uses a light pattern obtained by changing brightness of visible-light type signal transmitted from the reader for each time slot, returns a transmission pattern corresponding to the light pattern to the reader through the antenna, and checks whether a tag has been selected by the reader.

11. The tag selection type optical RFID tag depending on presence or not of visible light of claim 10, wherein the tag IC reads on/off information on the visible-light type signal and transmits a value of on/off to the reader using the ADC or the comparator, and returns the value of on/off, which includes a converted value when the ADC is used or includes level high information when the comparator is used, to the reader through the antenna.

12. The tag selection type optical RFID tag depending on presence or not of visible light of claim 10, wherein the tag IC includes:

a signal processor including an analog digital converter (ADC) or comparator connected to the photodiode to receive an electrical signal therefrom, and configured to receive the visible-light type signal and to process the visible-light type signal to acquire information;

a digital part configured to receive the information on the visible-light type signal from the signal processor, to perform control to return a value determined to correspond to the information to the reader, and to transmit data stored in a memory to the reader according to a command obtained by demodulating the electrical signal of the photodiode;

a voltage multiplier configured to receive an RF signal from the antenna and to convert and amplify the RF signal to DC power required for an operation;

an analog part configured to transmit data, to be transmitted to the digital part, to the reader via a backscattering process;

a modulator configured to modulate the signal transmitted through the antenna; and a demodulator configured to demodulate the signal received through the antenna.

13. The tag selection type optical RFID tag depending on presence or not of visible light of claim 12, wherein the tag IC includes a SoC chip separated from the photodiode.

14. A tag selection type optical radio frequency identification (RFID) tag depending on presence or not of visible light, comprising:

a photodiode configured to convert a visible light-type signal transmitted from a reader into an electrical signal;

a tag integrated circuit (10) configured to read information on the visible-light type signal using an analog digital converter (ADC) or comparator connected to the photodiode to receive the electrical signal therefrom, configured to be operated using energy obtained by converting a radio frequency (RF) signal received from the reader, to return a value determined to correspond to information to the reader, and configured to transmit stored data according to a command obtained by demodulating the electrical signal of the photodiode to the reader; and an antenna configured to facilitate reception of the RF signal by the tag IC or to facilitate transmission of the value and the data from the tag IC, wherein the tag IC includes:

a signal processor including an analog digital converter (ADC) or comparator connected to the photodiode to receive an electrical signal therefrom, and configured to receive the visible-light type signal and to process the visible-light type signal to acquire information;

a digital part configured to receive the information on the visible-light type signal from the signal processor, to perform control to return a value determined to correspond to the information to the reader, and to transmit data stored in a memory to the reader according to a command obtained by demodulating the electrical signal of the photodiode;

a voltage multiplier configured to receive an RF signal from the antenna and to convert and amplify the RF signal to DC power required for an operation;

an analog part configured to transmit data, to be transmitted to the digital part, to the reader via a backscattering process;

a modulator configured to modulate the signal transmitted through the antenna; and a demodulator configured to demodulate the signal received through the antenna.

15. The tag selection type optical RFID tag depending on presence or not of visible light of claim 14, wherein the tag IC reads on/off information on the visible-light type signal and transmits a value of on/off to the reader using the ADC or the comparator, and returns the value of on/off, which includes a converted value when the ADC is used or includes level high information when the comparator is used, to the reader through the antenna.

16. The tag selection type optical RFID tag depending on presence or not of visible light of claim 14, wherein the tag IC includes a SoC chip separated from the photodiode.

* * * * *